US010606317B2

(12) United States Patent
Chen

(10) Patent No.: US 10,606,317 B2
(45) Date of Patent: Mar. 31, 2020

(54) CURVED BACKBOARD ASSEMBLY AND CURVED DISPLAY DEVICE

(71) Applicant: Shenzhen China Star Optoelectronics Technology Co., Ltd., Shenzhen (CN)

(72) Inventor: Weifeng Chen, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/392,626

(22) Filed: Apr. 24, 2019

(65) Prior Publication Data

US 2019/0250670 A1     Aug. 15, 2019

Related U.S. Application Data

(63) Continuation of application No. 15/539,688, filed on Jun. 25, 2017, now Pat. No. 10,324,498.

(30) Foreign Application Priority Data

Apr. 13, 2017   (CN) .......................... 2017 1 0241021

(51) Int. Cl.
*G06F 1/16*   (2006.01)
*G09F 9/00*   (2006.01)
*G09F 9/30*   (2006.01)

(52) U.S. Cl.
CPC .............. *G06F 1/1652* (2013.01); *G09F 9/00* (2013.01); *G09F 9/301* (2013.01)

(58) Field of Classification Search
CPC ...... G06F 1/1652; G06F 9/301; G06F 3/1446; H05K 5/0017; H05K 5/0208; H05K 5/0217; H05K 5/0021; G09F 9/3026
See application file for complete search history.

(56) References Cited

U.S. PATENT DOCUMENTS

| 9,182,620 B1* | 11/2015 | Yu ......................... G06F 1/1601 |
| 2014/0240906 A1* | 8/2014 | Seo ......................... A47B 81/06 361/679.01 |
| 2015/0355675 A1* | 12/2015 | Lv ......................... F16M 11/08 361/679.21 |
| 2016/0300513 A1* | 10/2016 | Ren ......................... G09F 9/301 |
| 2016/0309598 A1* | 10/2016 | Yamaguchi ............... G09F 9/30 |
| 2017/0031518 A1* | 2/2017 | An ......................... G06F 1/1652 |

(Continued)

*Primary Examiner* — Daniel P Wicklund
*Assistant Examiner* — Christopher L Augustin
(74) *Attorney, Agent, or Firm* — Leong C. Lei

(57) ABSTRACT

A curved backboard assembly includes a curved metal plate and a curved plastic plate mounted to the curved metal plate. The curved metal plate includes longitudinal positioning slots and a set of transverse positioning slots, and the curved plastic plate includes longitudinal positioning pawls and a set of transverse positioning pawls. Each of the longitudinal positioning pawls is received into and set in engagement with one of the longitudinal positioning slots. The curved plastic plate is compressible to allow the transverse positioning pawls to be respectively received into and set in engagement with the transverse positioning slots and a spring force exerted by the curved plastic plate keeps the transverse positioning pawls in the transverse position slots. A curved display device that includes the above curved backboard assembly is also provided.

16 Claims, 7 Drawing Sheets

(56) References Cited

U.S. PATENT DOCUMENTS

2017/0124937 A1* 5/2017 Kim .................... G09G 3/2096
2017/0127539 A1* 5/2017 Drabant ............... H05K 5/0021
2017/0164487 A1* 6/2017 Kim ....................... H05K 7/142
2017/0310798 A1* 10/2017 Song .................... G06F 1/1652

* cited by examiner

CURVED BACKBOARD ASSEMBLY AND CURVED DISPLAY DEVICE

CROSS REFERENCE TO RELATED APPLICATIONS

This is a continuation application of co-pending patent application Ser. No. 15/539,688, filed on Jun. 25, 2017, which is a national stage of PCT Application No. PCT/CN2017/085194 filed on May 19, 2017, claiming foreign priority of Chinese Patent Application No. 201710241021.6, filed on Apr. 13, 2017.

BACKGROUND OF THE INVENTION

1. Field of the Invention

The present invention relates to the field of display technology, and more particular to a curved backboard assembly and a curved display device.

2. The Related Arts

Recently, with the development of display technology, major manufacturers have marketed curved display devices, such as curved television. Generally speaking, the curved display device allows for the best viewing effect from center to edge, while a regular display device has poor capability of displaying at edges of a screen. The curved display device has a screen that is entirely of a curved design to provide a wide full-view image, providing the same visual enjoyment at both the central portion and the circumferential portion of the screen, ensuring clarity of observation of image at two opposite side edges of the screen, and also reducing distortion of off-axis viewing for viewing at a short distance, making the entire screen spacing from human eye lens by a consistent distance so that it is easier for a viewer to feel personally in the scene to have the feeling of immersion. Further, the curved display devices allow a viewer's viewing distance to be extended, achieving better experience of viewing. Thus, compared to the regular display devices, the curved display devices have great advantages, including: (1) product differentiating, (2) wider viewable angle, and (3) reduced distortion for short distance viewing The increasing expansion of the curved product market makes the competition among curved product more and more violent, particularly, competition in production costs getting unceasingly severer. In the known processes of producing curved display devices, specific operations are first performed to make a display panel curved by a predetermined curvature, and then a backlight module (including a backboard and a plastic frame used in combination with the backboard) is used to fix the curved display panel so as to form a curved display device. It is known that the fixed cost of a display device is generally determined by how good the structure of the product is. However, the conventional curved display devices often involve backboards that are plastic backboards and a relatively large number of bolts are necessary for fixation. This affects the entire outside configuration design of the curved display device and efficiencies of assembly and rework are both low.

SUMMARY OF THE INVENTION

An objective of the present invention is to provide a curved backboard assembly, which resolves the issue that the assembling and disassembling of a conventional curved backboard are complicated and also provides supporting conditions for a bettered design of an outside configuration of the backboard.

Another objective of the present invention is to provide a curved display device, which uses the above curved backboard assembly so that the assembling and disassembling processes are simple, the outside configuration is good looking, and the cost of the curved display device can be reduced.

To achieve the above objectives, the present invention provides a curved backboard assembly, which comprises a curved ferrous metal plate and a curved plastic plate mounted to a back side of the curved ferrous metal plate;

wherein the curved ferrous metal plate is provided, on a back surface thereof, with a plurality of longitudinal positioning slots and at least one set of transverse positioning slots;

each of the longitudinal positioning slots has a longitudinal opening in a top-bottom direction;

each set of transverse positioning slots comprises two transverse positioning slots that are respectively arranged at left and right sides in a symmetric manner and the two transverse positioning slots respectively have transverse openings that are in a left-right direction and have opposite opening directions;

the curved plastic plate is provided, on a front surface thereof, with a plurality of longitudinal positioning pawls and at least one set of transverse positioning pawls;

each one of the longitudinal positioning pawls is receivable into and set in retaining engagement with one of the longitudinal positioning slots via the longitudinal opening; and each set of transverse positioning pawls comprises two transverse positioning pawls that are respectively arranged at left and right sides in a symmetric manner and the two transverse positioning pawls of each set of transverse positioning pawls are respectively receivable into and in retaining engagement with the two transverse positioning slots of one set of transverse positioning slots via the transverse openings.

The longitudinal positioning slots and the transverse positioning slots are formed on the curved ferrous metal plate though stamping.

The longitudinal positioning slots are each formed as a raised bridge through stamping and each of the longitudinal positioning slots is formed to show an opening configuration at an end thereof that is opposite to the longitudinal opening thereof; and the transverse positioning slots are each formed as a raised bump and each of the transverse positioning slots is formed to show a closed configuration at an end thereof that is opposite to the transverse opening thereof.

The longitudinal positioning pawls and the transverse positioning pawls are each an L-shaped pawl.

In each set of transverse positioning slots, opening directions of the transverse openings of the two transverse positioning slots are facing toward each other; and in each set of transverse positioning pawls, directions of pawls of the two transverse positioning pawls are facing away from each other.

An opening direction of the longitudinal opening of each of the longitudinal positioning slots faces downward; and a direction of pawl of each of the longitudinal positioning pawls faces upward.

The plurality of longitudinal positioning slots are arranged above the transverse positioning slots on the back surface of the curved ferrous metal plate.

The number of the longitudinal positioning slots involved is six, which are respectively a first longitudinal positioning slot, a second longitudinal positioning slot, a third longitudinal positioning slot, a fourth longitudinal positioning slot, a fifth longitudinal positioning slot, and a sixth longitudinal positioning slot; the six longitudinal positioning slots are arranged in two lines on the back surface of the curved ferrous metal plate, wherein the first longitudinal positioning slot, the second longitudinal positioning slot, the third longitudinal positioning slot, and the fourth longitudinal positioning slot are lined up from right to left on the back surface of the curved ferrous metal plate to define a first line and the fifth longitudinal positioning slot and the sixth longitudinal positioning slot are respectively arranged below the first longitudinal positioning slot and the fourth longitudinal positioning slot and define a second line; and the number of the transverse positioning slots involved makes up one set and the two transverse positioning slots of the one set are respectively a first transverse positioning slots and a second transverse positioning slots, wherein the first transverse positioning slot and the second transverse positioning slot are respectively located below the fifth longitudinal positioning slot and the sixth longitudinal positioning slot.

The curved ferrous metal plate and the curved plastic plate have curvatures that are substantially consistent with each other.

The present invention also provides a curved display device, which comprises the above curved backboard assembly.

The present invention further provides a curved backboard assembly, which comprises a curved ferrous metal plate and a curved plastic plate mounted to a back side of the curved ferrous metal plate;

wherein the curved ferrous metal plate is provided, on a back surface thereof, with a plurality of longitudinal positioning slots and at least one set of transverse positioning slots;

each of the longitudinal positioning slots has a longitudinal opening in a top-bottom direction;

each set of transverse positioning slots comprises two transverse positioning slots that are respectively arranged at left and right sides in a symmetric manner and the two transverse positioning slots respectively have transverse openings that are in a left-right direction and have opposite opening directions;

the curved plastic plate is provided, on a front surface thereof, with a plurality of longitudinal positioning pawls and at least one set of transverse positioning pawls;

each one of the longitudinal positioning pawls is receivable into and set in retaining engagement with one of the longitudinal positioning slots via the longitudinal opening; and each set of transverse positioning pawls comprises two transverse positioning pawls that are respectively arranged at left and right sides in a symmetric manner and the two transverse positioning pawls of each set of transverse positioning pawls are respectively receivable into and in retaining engagement with the two transverse positioning slots of one set of transverse positioning slots via the transverse openings;

wherein the longitudinal positioning slots and the transverse positioning slots are formed on the curved ferrous metal plate though stamping; and wherein the curved ferrous metal plate and the curved plastic plate have curvatures that are substantially consistent with each other.

The efficacy of the present invention is that the present invention provides a curved backboard assembly, which comprises a curved ferrous metal plate and a curved plastic plate mounted to a back side of the curved ferrous metal plate. The curved ferrous metal plate is provided, on a back surface thereof, with a plurality of longitudinal positioning slots and at least one set of transverse positioning slots, and the curved plastic plate is provided, on a front surface thereof, with a plurality of longitudinal positioning pawls and at least one set of transverse positioning pawls. The one set of transverse positioning pawls are respectively received into and set in engagement with the one set of transverse positioning slots. Each of the longitudinal positioning pawls is received into and set in engagement with one of the longitudinal positioning slots. The present invention adopts fitting and retaining engagement to achieve fixing and eliminates the conventional way of fixing with screws used in a conventional backboard arrangement so as to resolve the problem that assembling and disassembling of the conventional curved backboard are complicated and also to provide supporting condition for a better design of the outside configuration of a backboard. The present invention provides a curved display device, which uses the above curved backboard assembly, making assembling and disassembling operations simple and easy, providing a good looking outside configuration, and lowering down the cost of the curved display device.

BRIEF DESCRIPTION OF THE DRAWINGS

The technical solution, as well as other beneficial advantages, of the present invention will be apparent from the following detailed description of embodiments of the present invention, with reference to the attached drawing.

In the drawings.

DETAILED DESCRIPTION OF THE PREFERRED EMBODIMENTS

To further expound the technical solution adopted in the present invention and the advantages thereof, a detailed description will be given with reference to the preferred embodiments of the present invention and the drawings thereof.

Firstly, the present invention provides a curved backboard assembly, which comprises a curved ferrous metal plate 100 and a curved plastic plate 200 mounted to a back side of the curved ferrous metal plate 100, wherein the curved ferrous metal plate 100 functions to maintain a structural strength of the curved display device and the curved plastic plate 200 functions to shield and cover and protect components, such as circuit board and wires, on a back side of the display device so as to better an outside configuration of the back side of the curved display device.

Figure 1:
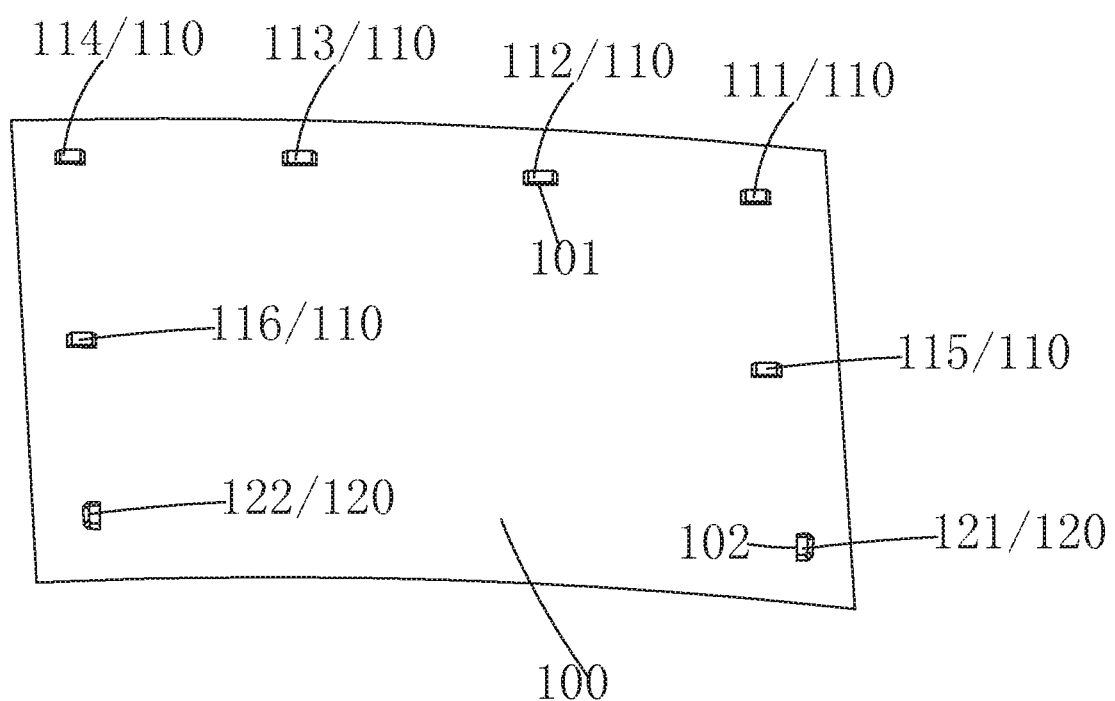
FIG. 1 is a schematic view illustrating a back side of a curved ferrous metal plate of a curved backboard assembly according to the present invention.

As shown in FIG. 1, the curved ferrous metal plate 100 is provided, on a back surface thereof, with a plurality of longitudinal positioning slots 110 and at least one set of transverse positioning slots 120;

each of the longitudinal positioning slots 110 has a longitudinal opening 101 in a top-bottom direction;

each set of transverse positioning slots 120 comprises two transverse positioning slots 120 that are respectively arranged at left and right sides in a symmetric manner and the two transverse positioning slots 120 respectively have transverse openings 102 that are in a left-right direction and have opposite opening directions.

Figure 2:
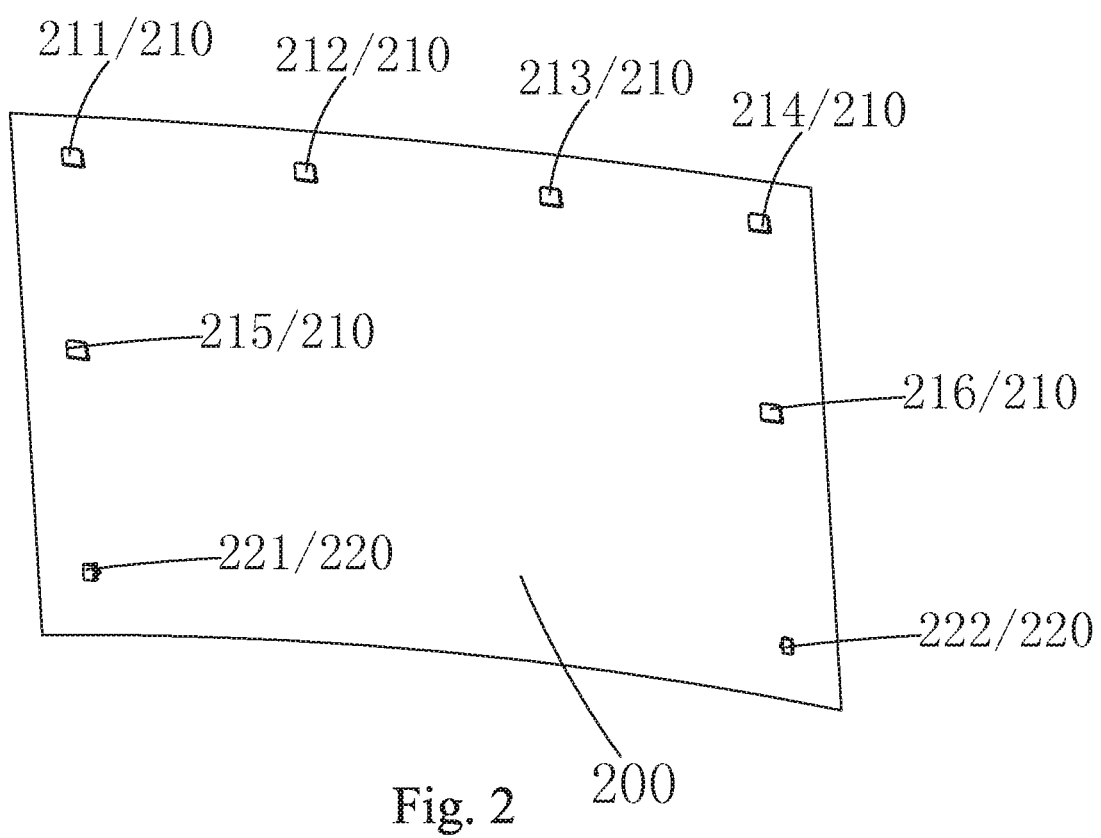
FIG. 2 is a schematic view illustrating a front side of a curved plastic plate of the curved backboard assembly according to the present invention.

As shown in FIG. 2, the curved plastic plate 200 is provided on a front surface thereof with a plurality of longitudinal positioning pawls 210 respectively corresponding to the plurality of longitudinal positioning slots 110 and at least one set of transverse positioning pawls 220 corresponding to the at least one set of transverse positioning slots 120;

each one of the longitudinal positioning pawls 210 is received into and set in retaining engagement with one of the longitudinal positioning slots 110 via the longitudinal opening 101;

each set of transverse positioning pawls 220 comprises two transverse positioning pawls 220 that are respectively arranged at left and right sides in a symmetric manner and the two transverse positioning pawls 220 of each set of transverse positioning pawls 220 are respectively received into and in retaining engagement with the two transverse positioning slots 120 of one set of transverse positioning slots 120 via the transverse openings 102.

Specifically, the longitudinal positioning slots 110 and the transverse positioning slots 120 are formed on the curved ferrous metal plate 100 though stamping.

Specifically, the longitudinal positioning slots 110 are each formed as a raised bridge through stamping and each of the longitudinal positioning slots 110 is formed to show an opening configuration at an end thereof that is opposite to the longitudinal opening 101 thereof;

the transverse positioning slots 120 are each formed as a raised bump and each of the transverse positioning slots 120 is formed to show a closed configuration at an end thereof that is opposite to the transverse opening 102 thereof.

Figure 3:
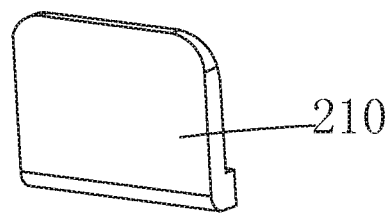
FIG. 3 is a schematic view, in an enlarged form, illustrating a longitudinal positioning pawl of FIG. 2.
Figure 4:
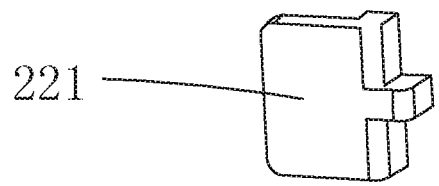
FIG. 4 is a schematic view, in an enlarged form, illustrating a first transverse positioning pawl of FIG. 2.
Figure 5:
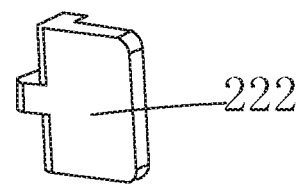
FIG. 5 is a schematic view, in an enlarged form, illustrating a second transverse positioning pawl of FIG. 2.

Specifically, as shown in FIGS. 3-5, the longitudinal positioning pawls 210 and the transverse positioning pawls 220 are each an L-shaped pawl.

Specifically, in each set of transverse positioning slots 120, the opening directions of the transverse openings 102 of the two transverse positioning slots 120 are facing toward each other; and in each set of transverse positioning pawls 220, the directions of pawls of the two transverse positioning pawls 220 are facing away from each other.

Specifically, the opening direction of the longitudinal opening 101 of each of the longitudinal positioning slots 110 faces downward; a direction of pawl of each of the longitudinal positioning pawls 210 faces upward.

Specifically, the plurality of longitudinal positioning slots 110 are arranged above the transverse positioning slots 120 on the back surface of the curved ferrous metal plate 100.

Specifically, as shown in FIG. 2, the number of the longitudinal positioning slots 110 involved is six (6), which are respectively designated as a first longitudinal positioning slot 111, a second longitudinal positioning slot 112, a third longitudinal positioning slot 113, a fourth longitudinal positioning slot 114, a fifth longitudinal positioning slot 115, and a sixth longitudinal positioning slot 116; the six longitudinal positioning slots 110 are arranged in two lines on the back surface of the curved ferrous metal plate 100, wherein the first longitudinal positioning slot 111, the second longitudinal positioning slot 112, the third longitudinal positioning slot 113, and the fourth longitudinal positioning slot 114 are lined up from right to left on the back surface of the curved ferrous metal plate 100 to define a first line and the fifth longitudinal positioning slot 115 and the sixth longitudinal positioning slot 116 are respectively arranged below the first longitudinal positioning slot 111 and the fourth longitudinal positioning slot 114 and define a second line;

the number of the transverse positioning slots 120 involved makes up one set and the two transverse positioning slots 120 of the one set are respectively designated as a first transverse positioning slots 121 and a second transverse positioning slots 122, wherein the first transverse positioning slot 121 and the second transverse positioning slot 122 are respectively located below the fifth longitudinal positioning slot 115 and the sixth longitudinal positioning slot 116.

In a corresponding manner, the curved plastic plate 200 is provided thereon with six longitudinal positioning pawls 210, which are respectively a first longitudinal positioning pawl 211, a second longitudinal positioning pawl 212, a third longitudinal positioning pawl 213, a fourth longitudinal positioning pawl 214, a fifth longitudinal positioning pawl 215, and a sixth longitudinal positioning pawl 216 respectively mating and engageable with the first longitudinal positioning slot 111, the second longitudinal positioning slot 112, the third longitudinal positioning slot 113, the fourth longitudinal positioning slot 114, the fifth longitudinal positioning slot 115, and the sixth longitudinal positioning slot 116; the six longitudinal positioning pawls 210 are arranged in two lines on the front surface of the curved plastic plate 200, wherein the first longitudinal positioning pawl 211, the second longitudinal positioning pawl 212, the third longitudinal positioning pawl 213, and the fourth longitudinal positioning pawl 214 are lined up from left to right on the front surface of the curved plastic plate 200 to define a first line and the fifth longitudinal positioning pawl 215 and the sixth longitudinal positioning pawl 216 are respectively arrange below the first longitudinal positioning pawl 211 and the fourth longitudinal positioning pawl 214 and define a second line;

the number of the transverse positioning pawls 220 involved makes up one set, including a first transverse positioning pawl 221 and a second transverse positioning pawl 222, which are respectively mating and engageable with the first transverse positioning slot 121 and the second transverse positioning slot 122, wherein the first transverse positioning pawl 221 and the second transverse positioning pawl 222 are respectively located below the fifth longitudinal positioning pawl 215 and the sixth longitudinal positioning pawl 216.

Figure 6:
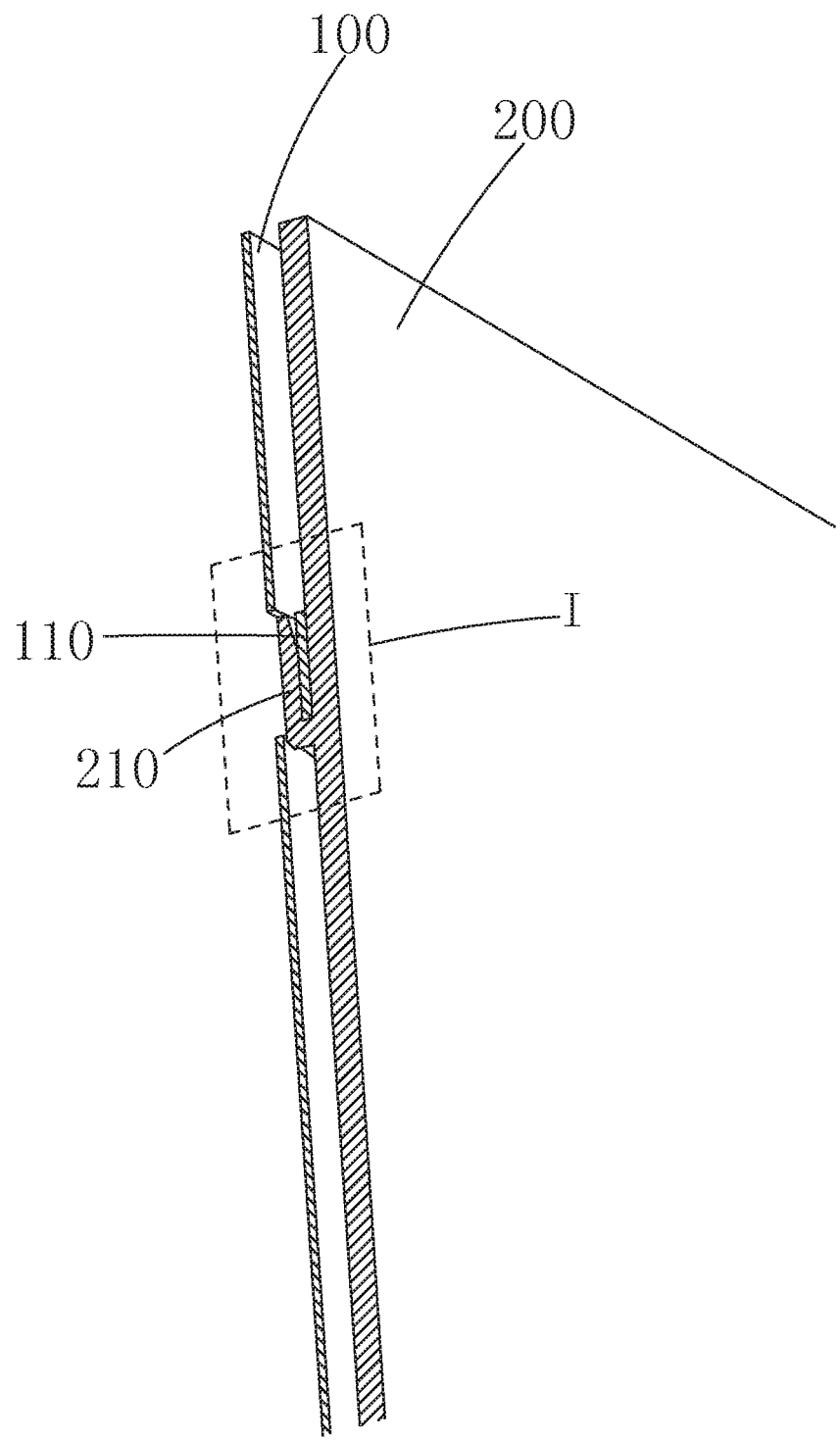
FIG. 6 is a cross-sectional view of the curved backboard assembly according to the present invention taken in a vertical, top-bottom, direction to illustrate the longitudinal positioning pawl in retaining engagement with a longitudinal positioning slot.
Figure 7:
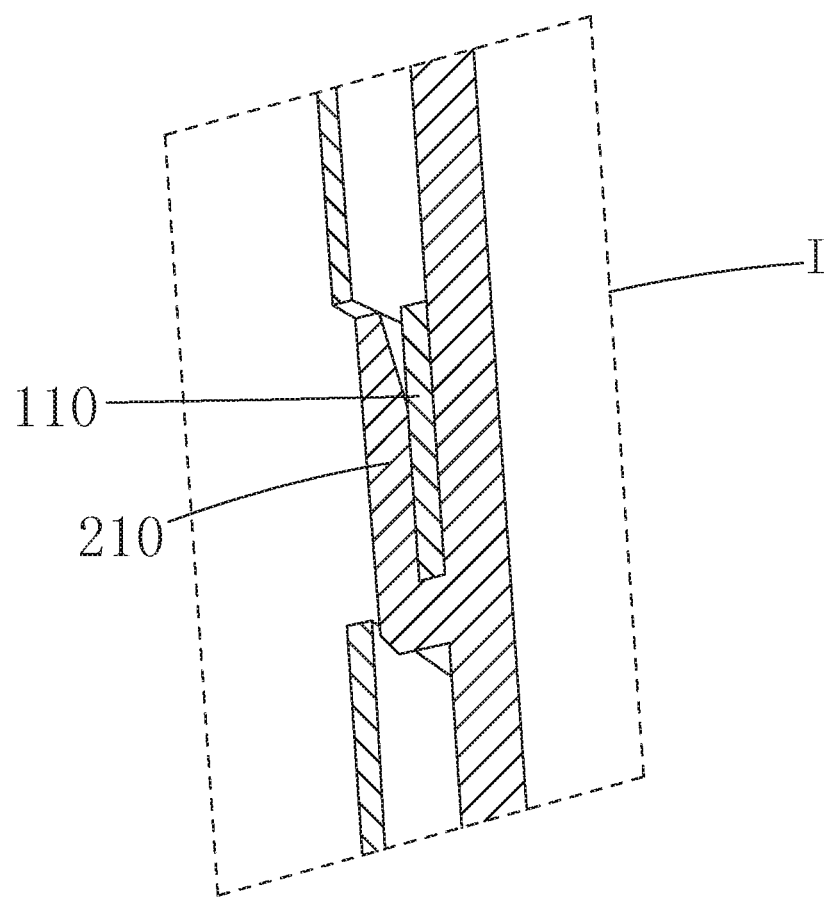
FIG. 7 is an enlarged view, in a schematic form, showing a portion of the curved backboard assembly marked "I" in FIG. 6.
Figure 8:
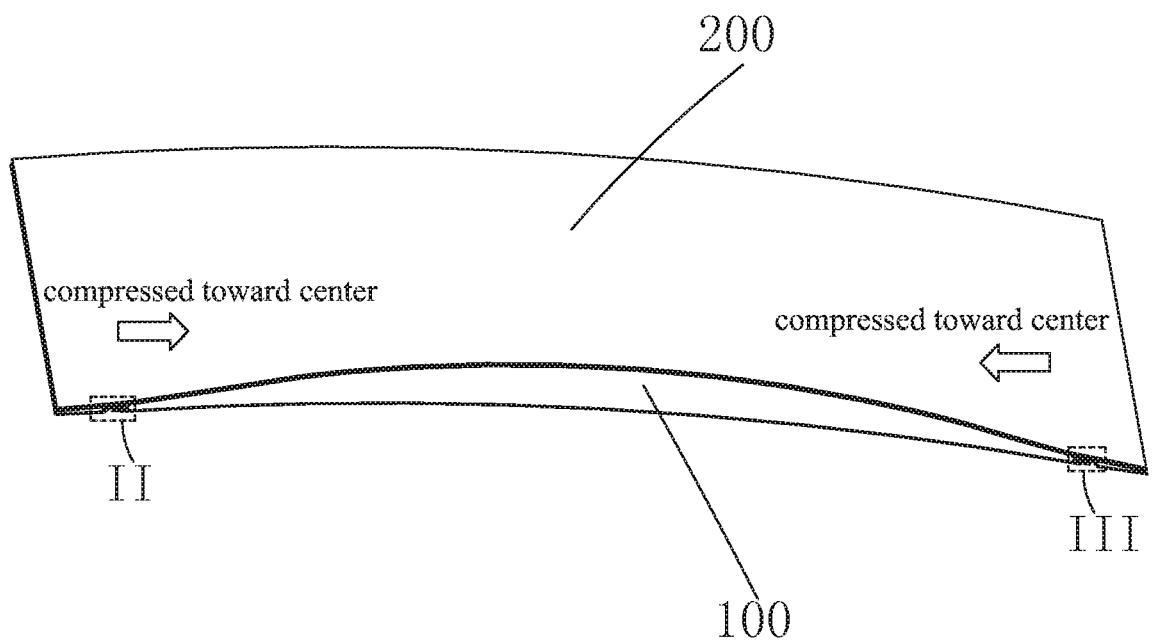
FIG. 8 is a schematic view, in a sectioned form taken in a horizontal, left-right, direction, of the curved backboard assembly according to the present invention to illustrate a set of transverse positioning pawls in retaining engagement with a set of transverse positioning slots.
Figure 9:
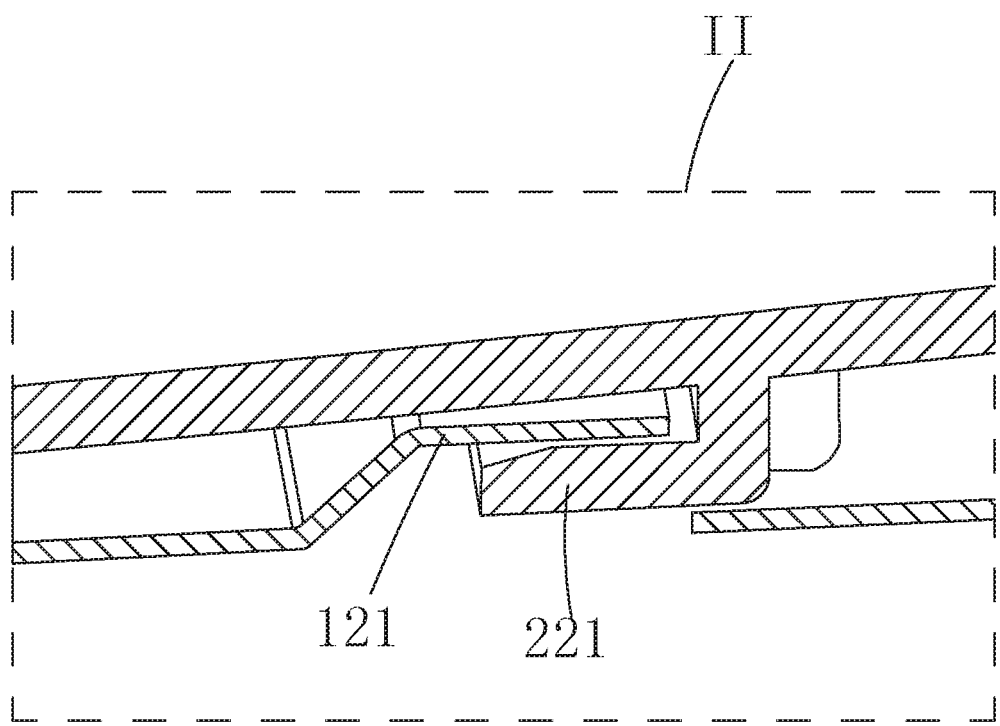
FIG. 9 is an enlarged view, in a schematic form, showing a portion of the curved backboard assembly marked "II" in FIG. 8.
Figure 10:
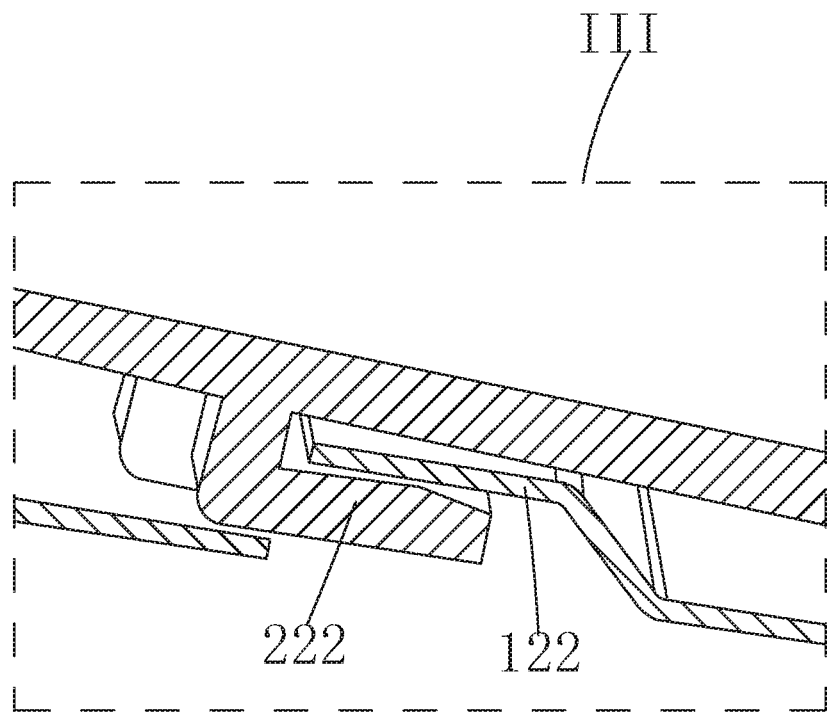
FIG. 10 is an enlarged view, in a schematic form, showing a portion of the curved backboard assembly marked "III" in FIG. 8.

A specific process of mounting the curved plastic plate 200 of the curved backboard assembly of the present invention to the curved ferrous metal plate 100 is as follows. As shown in FIGS. 6-7, the curved plastic plate 200 is first positioned on the curved ferrous metal plate 100 and is pushed in a direction from bottom to top to make the first longitudinal positioning pawl 211, the second longitudinal positioning pawl 212, the third longitudinal positioning pawl 213, the fourth longitudinal positioning pawl 214, the fifth longitudinal positioning pawl 215, and the sixth longitudinal positioning pawl 216 of the curved plastic plate 200 respectively engaging with and retained in the first longitudinal positioning slot 111, the second longitudinal positioning slot 112, the third longitudinal positioning slot 113, the fourth longitudinal positioning slot 114, the fifth longitudinal positioning slot 115, and the sixth longitudinal positioning slot 116 of the curved ferrous metal plate 100. At this moment, the first transverse positioning pawl 221 and the second transverse positioning pawl 222 of the curved plastic plate 200 are not placed into and set in engagement with the first transverse positioning slot 121 and the second transverse positioning slot 122. Afterwards, as shown in FIGS. 8-10, the left and right side edges of the curved plastic plate 200 are compressed toward a center so as to have the first transverse positioning pawl 221 retracted inwardly relative to the first transverse positioning slot 121 and also have the second transverse positioning pawl 222 retracted inwardly relative to the second transverse positioning slot 122 until the first transverse positioning pawl 221 and the second transverse positioning pawl 222 are respectively receivable into and set in engagement with the first transverse positioning slot 121 and the second transverse positioning slot 122, where external forces that are applied to cause the compression are removed so that spring-back characteristics of the curved plastic plate 200 automatically drive the first transverse positioning pawl 221 and the second transverse positioning pawl 222 to move into and get in engagement with the first transverse positioning slot 121 and the second transverse positioning slot 122 so as to mount the curved plastic plate 200 to the curved ferrous metal plate 100 without additional fixing achieved with other components, such as bolts.

The present invention provides a curved backboard assembly, which adopts fitting and retaining engagement to fix the curved plastic plate 200 and the curved ferrous metal plate 100 and eliminates the conventional way of fixing with screws used in a conventional backboard arrangement so as to resolve the problem that assembling and disassembling of the conventional curved backboard are complicated and also to provide supporting condition for a better design of the outside configuration of a backboard.

Specifically, the curved ferrous metal plate 100 and the curved plastic plate 200 have curvatures that are substantially consistent with each other.

Based on the above-described curved backboard assembly, the present invention also provides a curved display device, which comprises the above-described curved backboard assembly, and repeated description of the specific structure of the curved backboard assembly will be omitted herein.

Specifically, the curved display device further comprises structural components including a display panel and a front bezel. In a specific assembling process of the curved display device, the display panel and the front bezel are first mounted to the curved ferrous metal plate 100 and then, the curved plastic plate 200 is mounted to the back side of the curved ferrous metal plate 100 to complete the assembly of the curved display device. The assembling process is simple and easy, allowing for reduction of assembling steps and labor involved so as to lower down the cost of the curved display device.

In summary, the present invention provides a curved backboard assembly, which comprises a curved ferrous metal plate and a curved plastic plate mounted to a back side of the curved ferrous metal plate. The curved ferrous metal plate is provided, on a back surface thereof, with a plurality of longitudinal positioning slots and at least one set of transverse positioning slots, and the curved plastic plate is provided, on a front surface thereof, with a plurality of longitudinal positioning pawls and at least one set of transverse positioning pawls. The one set of transverse positioning pawls are respectively received into and set in engagement with the one set of transverse positioning slots. Each of the longitudinal positioning pawls is received into and set in engagement with one of the longitudinal positioning slots. The present invention adopts fitting and retaining engagement to achieve fixing and eliminates the conventional way of fixing with screws used in a conventional backboard arrangement so as to resolve the problem that assembling and disassembling of the conventional curved backboard are complicated and also to provide supporting condition for a better design of the outside configuration of a backboard. The present invention provides a curved display device, which uses the above curved backboard assembly, making assembling and disassembling operations simple and easy, providing a good looking outside configuration, and lowering down the cost of the curved display device.

Based on the description given above, those having ordinary skills in the art may easily contemplate various changes and modifications of he technical solution and the technical ideas of the present invention. All these changes and modifications are considered belonging to the protection scope of the present invention as defined in the appended claims.

What is claimed is:

1. A curved backboard assembly, comprising a curved metal plate and a curved plastic plate mounted to a back side of the curved metal plate;
   wherein the curved metal plate is provided, on a back surface thereof, with a plurality of longitudinal positioning slots and at least one set of transverse positioning slots;
   each of the longitudinal positioning slots has a longitudinal opening in a top-bottom direction;
   each set of transverse positioning slots comprises two transverse positioning slots that are respectively arranged at left and right sides in a symmetric manner and the two transverse positioning slots respectively have transverse openings that are in a left-right direction and have opposite opening directions;
   the curved plastic plate is provided, on a front surface thereof, with a plurality of longitudinal positioning pawls and at least one set of transverse positioning pawls;
   each one of the longitudinal positioning pawls is receivable into and set in retaining engagement with one of the longitudinal positioning slots via the longitudinal opening; and
   each set of transverse positioning pawls comprises two transverse positioning pawls that are respectively arranged at left and right sides in a symmetric manner and the two transverse positioning pawls of each set of transverse positioning pawls are respectively receivable into and in retaining engagement with the two transverse positioning slots of one set of transverse positioning slots via the transverse openings, wherein with the longitudinal positioning pawls of the curved plastic plate being in the retaining engagement with the longitudinal positioning slots of the curved metal plate, the curved plastic plate is deformable in the left-right direction to switch a spacing distance between the two transverse positioning pawls of each set of transverse positioning pawls between a first value and a second value that is greater than the first value, wherein the first value of the spacing distance allows the transverse positioning pawls to be receivable through the transverse openings into the two transverse positioning slots of the one set of transverse positioning slots and the second value of the spacing distance prevents the transverse positioning pawls from disengaging from the transverse openings of the two transverse positioning slots of the one set of transverse positioning slots, wherein the spacing distance between the two transverse positioning pawls is kept at the second value by a spring force of the curved plastic plate.

2. The curved backboard assembly as claimed in claim 1, wherein the longitudinal positioning slots and the transverse positioning slots are formed on the curved metal plate though stamping.

3. The curved backboard assembly as claimed in claim 2, wherein the longitudinal positioning slots are each formed as a raised bridge through stamping and each of the longitudinal positioning slots is formed to show an opening configuration at an end thereof that is opposite to the longitudinal opening thereof; and the transverse positioning slots are each formed as a raised bump and each of the transverse positioning slots is formed to show a closed configuration at an end thereof that is opposite to the transverse opening thereof.

4. The curved backboard assembly as claimed in claim 1, wherein the longitudinal positioning pawls and the transverse positioning pawls are each an L-shaped pawl.

5. The curved backboard assembly as claimed in claim 4, wherein in each set of transverse positioning slots, opening directions of the transverse openings of the two transverse positioning slots are facing toward each other; and in each set of transverse positioning pawls, directions of pawls of the two transverse positioning pawls are facing away from each other.

6. The curved backboard assembly as claimed in claim 5, wherein an opening direction of the longitudinal opening of each of the longitudinal positioning slots faces downward; and a direction of pawl of each of the longitudinal positioning pawls faces upward.

7. The curved backboard assembly as claimed in claim 6, wherein the plurality of longitudinal positioning slots are arranged above the transverse positioning slots on the back surface of the curved metal plate.

8. The curved backboard assembly as claimed in claim 6, wherein the number of the longitudinal positioning slots involved is six, which are respectively a first longitudinal positioning slot, a second longitudinal positioning slot, a third longitudinal positioning slot, a fourth longitudinal positioning slot, a fifth longitudinal positioning slot, and a sixth longitudinal positioning slot; the six longitudinal positioning slots are arranged in two lines on the back surface of the curved metal plate, wherein the first longitudinal positioning slot, the second longitudinal positioning slot, the third longitudinal positioning slot, and the fourth longitudinal positioning slot are lined up from right to left on the back surface of the curved metal plate to define a first line and the fifth longitudinal positioning slot and the sixth longitudinal positioning slot are respectively arranged below the first longitudinal positioning slot and the fourth longitudinal positioning slot and define a second line; and the number of the transverse positioning slots involved makes up one set and the two transverse positioning slots of the one set are respectively a first transverse positioning slots and a second transverse positioning slots, wherein the first transverse positioning slot and the second transverse positioning slot are respectively located below the fifth longitudinal positioning slot and the sixth longitudinal positioning slot.

9. A curved display device, comprising the curved backboard assembly as claimed in claim 1.

10. A curved backboard assembly, comprising a curved inelastic plate and a curved elastic plate mounted to a back side of the curved inelastic plate;

wherein the curved inelastic plate is provided, on a back surface thereof, with a plurality of longitudinal positioning slots and at least one set of transverse positioning slots;

each of the longitudinal positioning slots has a longitudinal opening in a top-bottom direction;

each set of transverse positioning slots comprises two transverse positioning slots that are respectively arranged at left and right sides in a symmetric manner and the two transverse positioning slots respectively have transverse openings that are in a left-right direction and have opposite opening directions;

the curved elastic plate is provided, on a front surface thereof, with a plurality of longitudinal positioning pawls and at least one set of transverse positioning pawls;

each one of the longitudinal positioning pawls is receivable into and set in retaining engagement with one of the longitudinal positioning slots via the longitudinal opening; and each set of transverse positioning pawls comprises two transverse positioning pawls that are respectively arranged at left and right sides in a symmetric manner and the two transverse positioning pawls of each set of transverse positioning pawls are respectively receivable into and in retaining engagement with the two transverse positioning slots of one set of transverse positioning slots via the transverse openings;

wherein the curved elastic plate is deformable in the left-right direction to switch a spacing distance between the two transverse positioning pawls of each set of transverse positioning pawls between a first value and a second value that is greater than the first value, wherein the first value of the spacing distance allows the transverse positioning pawls to be receivable through the transverse openings into the two transverse positioning slots of the one set of transverse positioning slots and the second value of the spacing distance prevents the transverse positioning pawls from disengaging from the transverse openings of the two transverse positioning slots of the one set of transverse positioning slots, wherein the spacing distance between the two transverse positioning pawls is kept at the second value by a spring force of the curved elastic plate.

11. The curved backboard assembly as claimed in claim 10, wherein the longitudinal positioning slots are each formed as a raised bridge through stamping and each of the longitudinal positioning slots is formed to show an opening configuration at an end thereof that is opposite to the longitudinal opening thereof; and the transverse positioning slots are each formed as a raised bump and each of the transverse positioning slots is formed to show a closed configuration at an end thereof that is opposite to the transverse opening thereof.

12. The curved backboard assembly as claimed in claim 10, wherein the longitudinal positioning pawls and the transverse positioning pawls are each an L-shaped pawl.

13. The curved backboard assembly as claimed in claim 12, wherein in each set of transverse positioning slots, opening directions of the transverse openings of the two transverse positioning slots are facing toward each other; and in each set of transverse positioning pawls, directions of pawls of the two transverse positioning pawls are facing away from each other.

14. The curved backboard assembly as claimed in claim 13, wherein an opening direction of the longitudinal opening of each of the longitudinal positioning slots faces downward; and a direction of pawl of each of the longitudinal positioning pawls faces upward.

15. The curved backboard assembly as claimed in claim 14, wherein the plurality of longitudinal positioning slots are arranged above the transverse positioning slots on the back surface of the curved inelastic plate.

16. The curved backboard assembly as claimed in claim 14, wherein the number of the longitudinal positioning slots involved is six, which are respectively a first longitudinal positioning slot, a second longitudinal positioning slot, a third longitudinal positioning slot, a fourth longitudinal positioning slot, a fifth longitudinal positioning slot, and a sixth longitudinal positioning slot; the six longitudinal positioning slots are arranged in two lines on the back surface of the curved inelastic plate, wherein the first longitudinal positioning slot, the second longitudinal positioning slot, the third longitudinal positioning slot, and the fourth longitudinal positioning slot are lined up from right to left on the back surface of the curved inelastic plate to define a first line and the fifth longitudinal positioning slot and the sixth longitudinal positioning slot are respectively arranged below the first longitudinal positioning slot and the fourth longitudinal positioning slot and define a second line; and the number of the transverse positioning slots involved makes up one set and the two transverse positioning slots of the one set are respectively a first transverse positioning slots and a second transverse positioning slots, wherein the first transverse positioning slot and the second transverse positioning slot are respectively located below the fifth longitudinal positioning slot and the sixth longitudinal positioning slot.

* * * * *